US008876186B2

United States Patent
Huelke

(10) Patent No.: US 8,876,186 B2
(45) Date of Patent: Nov. 4, 2014

(54) BREAKAWAY VISOR RETENTION CHECK

(71) Applicant: Ford Global Technologies, LLC, Dearborn, MI (US)

(72) Inventor: David Huelke, Milan, MI (US)

(73) Assignee: Ford Global Technologies, LLC, Dearborn, MI (US)

(*) Notice: Subject to any disclaimer, the term of this patent is extended or adjusted under 35 U.S.C. 154(b) by 7 days.

(21) Appl. No.: 13/830,997

(22) Filed: Mar. 14, 2013

(65) Prior Publication Data

US 2014/0265444 A1 Sep. 18, 2014

(51) Int. Cl.
*B60J 3/02* (2006.01)
*B62D 21/15* (2006.01)

(52) U.S. Cl.
CPC .................................. *B62D 21/15* (2013.01)
USPC ..................................... 296/97.9; 296/187.05

(58) Field of Classification Search
CPC ............. B60J 3/02; B60J 3/023; B60J 3/0213
USPC ................. 296/187.05, 97.1, 97.9; 248/230.7
See application file for complete search history.

(56) References Cited

U.S. PATENT DOCUMENTS

| 5,358,299 | A | * | 10/1994 | Seto | 296/97.9 |
|---|---|---|---|---|---|
| 5,397,088 | A | * | 3/1995 | White | 248/309.1 |
| 5,470,123 | A | * | 11/1995 | Snyder | 296/97.9 |
| 5,507,545 | A | * | 4/1996 | Krysiak | 296/97.9 |
| 5,544,928 | A |  | 8/1996 | Mori et al. |  |
| 5,567,098 | A | * | 10/1996 | Gordon | 411/48 |
| 6,368,009 | B1 | * | 4/2002 | Noda | 403/329 |
| 6,398,295 | B2 | * | 6/2002 | Asai | 296/214 |
| 6,491,333 | B2 | * | 12/2002 | Ichikawa et al. | 296/97.9 |
| 6,494,521 | B2 |  | 12/2002 | Hennessey |  |
| 6,679,538 | B1 | * | 1/2004 | Sturt | 296/97.9 |
| 6,799,795 | B1 |  | 10/2004 | Zapinski |  |
| 7,446,650 | B2 |  | 11/2008 | Scholfield et al. |  |
| 7,703,832 | B2 |  | 4/2010 | Shorter et al. |  |
| 7,798,552 | B2 | * | 9/2010 | Takai | 296/97.9 |
| 7,954,875 | B2 |  | 6/2011 | Bohner et al. |  |
| 8,678,468 | B2 | * | 3/2014 | Huelke et al. | 296/97.5 |
| 2001/0042999 | A1 | * | 11/2001 | Asai | 296/214 |
| 2002/0017799 | A1 | * | 2/2002 | Asai et al. | 296/97.9 |
| 2002/0017800 | A1 | * | 2/2002 | Ichikawa et al. | 296/97.9 |
| 2014/0021735 | A1 | * | 1/2014 | Huelke et al. | 296/97.9 |

FOREIGN PATENT DOCUMENTS

JP 2004189158 7/2004

OTHER PUBLICATIONS

Amtrak, "PRIIA 305 Next-Generation Equipment Committee Diesel Multiple Unit (DMU) Passenger Rail Cars, Chapter 16, Engineer's Cab and Train Controls," PRIIA 305-009, PRIIA 305-009/Amtrak 995 Technical Specification, Copyright 2012.

(Continued)

*Primary Examiner* — Gregory Blankenship
(74) *Attorney, Agent, or Firm* — Vichit Chea; Price Heneveld LLP

(57) ABSTRACT

A vehicle visor assembly having a visor which includes a first end pivotally coupled with a header, an intermediate portion, and a second end. A retention check is coupled with the header about a fastener. The retention check includes an outward protruding member for retaining the second end of the visor. A perforation is disposed between the member and the fastener and it is configured to fracture when the member receives an impact force.

19 Claims, 4 Drawing Sheets

(56) References Cited

OTHER PUBLICATIONS

Chang, Michael J. et al., "Modeling and Design for Vehicle Pitch and Drop of Body-On-Frame Vehicles," Society of Automotive Engineers, New York, NY, Etats-Unis, (2005) vol. 114, No. 6; (3134 p.) [Document : 10 p.] (9 ref.), pp. 329-338 [10 page(s) (article)], http://cat.inist.fr/?aModele=afficheN&cpsidt=17553422.

* cited by examiner

US 8,876,186 B2

BREAKAWAY VISOR RETENTION CHECK

FIELD OF THE INVENTION

The present invention generally relates to a vehicle visor assembly and more specifically to a breakaway retention check for a vehicle visor.

BACKGROUND OF THE INVENTION

It is common for vehicles to include a visor assembly attached above a windshield. Typically, these visor assemblies are adapted to block light rays, such as UV rays or other vehicle headlight rays, from reflecting against a driver or passenger's field of vision. In some instances, portions of the visor assembly may be exposed to an object moving forward, such as in an occupant's head during a vehicle collision. These exposed portions may cause injuries or otherwise provide irregular surfaces for obstructed motion of an object.

SUMMARY OF THE INVENTION

According to one aspect of the present invention, a vehicle visor assembly includes a visor having a first end pivotally coupled with a header, an intermediate portion, and a second end. A retention check is coupled with the header about a fastener. The retention check includes an outward protruding member for retaining the second end of the visor. A weakened portion is disposed between the member and the fastener and it is configured to fracture when the member receives an impact force.

According to another aspect of the present invention, a visor retention check includes a body portion for engaging a vehicle header. A member protrudes from the body portion and has a connector for retaining a visor. An aperture extends through the body portion to receive a fastener that couples with the vehicle header. A weakened portion surrounds the aperture and is adapted to fracture when the member receives an impact force.

According to another aspect of the present invention a retention check for a vehicle visor includes a body portion that has an interior side for engaging a header. A member protrudes from an exterior side of the body portion to engage the vehicle visor. An aperture extends between the exterior and interior sides to receive a fastener that couples with the header. A perforation surrounds the aperture to create a stress riser.

These and other aspects, objects, and features of the present invention will be understood and appreciated by those skilled in the art upon studying the following specification, claims, and appended drawings.

DETAILED DESCRIPTION OF THE PREFERRED EMBODIMENTS

Figure 1:
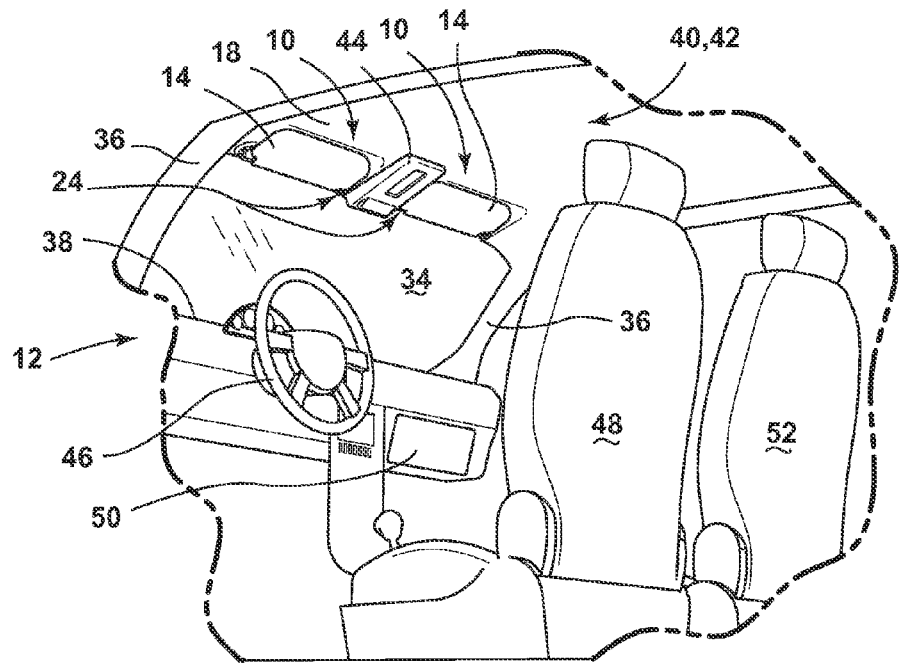
FIG. 1 is a bottom perspective view of a passenger compartment of a vehicle, illustrating a front windshield of the vehicle.

For purposes of description herein, the terms "upper," "lower," "right," "left," "rear," "front," "vertical," "horizontal," and derivatives thereof shall relate to the invention as oriented in FIG. 1. However, it is to be understood that the invention may assume various alternative orientations, except where expressly specified to the contrary. It is also to be understood that the specific devices and processes illustrated in the attached drawings, and described in the following specification are simply exemplary embodiments of the inventive concepts defined in the appended claims. Hence, specific dimensions and other physical characteristics relating to the embodiments disclosed herein are not to be considered as limiting, unless the claims expressly state otherwise.

Referring to FIGS. 1-9, reference numeral 10 generally designates a visor assembly, for a vehicle 12. The visor assembly 10 includes a visor 14 having a first end 16 pivotally coupled with a header 18, an intermediate portion 20, and a second end 22. A retention check 24 is coupled with the header 18 about a fastener 26. The retention check 24 includes an outward protruding member 28 for retaining the second end 22 of the visor 14. A weakened portion 30 is disposed between the member 28 and the fastener 26 and it is configured to fracture when the member 28 receives an impact force 32.

As shown in the embodiment illustrated in FIG. 1, the vehicle 12 typically includes a front windshield 34 defined between A-pillars 36 extending from a dash 38 of the vehicle 12 to a roof 40 of the vehicle 12. An upper portion of the windshield 34 is bordered by the header 18 that extends between the A-pillars 36. A headliner 42 is disposed over and defines an interior trim surface of the header 18. In the illustrated embodiment, the headliner 42 also extends rearward concealing the roof 40 of the vehicle 12 to further define the interior trim surface. An accessory compartment 44 is coupled with the header 18 centrally between the two A-pillars 36 and extends rearward on the interior surface of the headliner 42. It is contemplated that the accessory compartment 44 may be elongated, alternatively shaped, or otherwise not included on the header 18.

As further illustrated in FIG. 1, a pair of visor assemblies 10 are coupled with the header 18 and positioned on opposing sides of the accessory compartment 44. More specifically, the visor assemblies 10 are attached to a forward portion of the roof 40 proximate an upper portion of the windshield 34, which includes the header 18 covered with the headliner 42. Accordingly, one of the visor assemblies 10 is disposed on a driver's side of the vehicle 12 defined by the region having a steering wheel 46 and a driver's side seat 48. The other visor assembly 10 is disposed on a passenger side of the vehicle 12 having a glove compartment 50 and a passenger side seat 52. It is contemplated that more than two visor assemblies 10 may be include in the vehicle 12, and further that the visor assemblies 10 may be alternatively oriented on the header 18 or other interior surfaces of the vehicle 12. For purposes of description, the visor assembly 10 on the driver's side of the vehicle 12 will be described with the understanding that the opposing visor assembly 10 includes similar components constructed in a mirrored arrangement, unless specified to the contrary.

Figure 2:
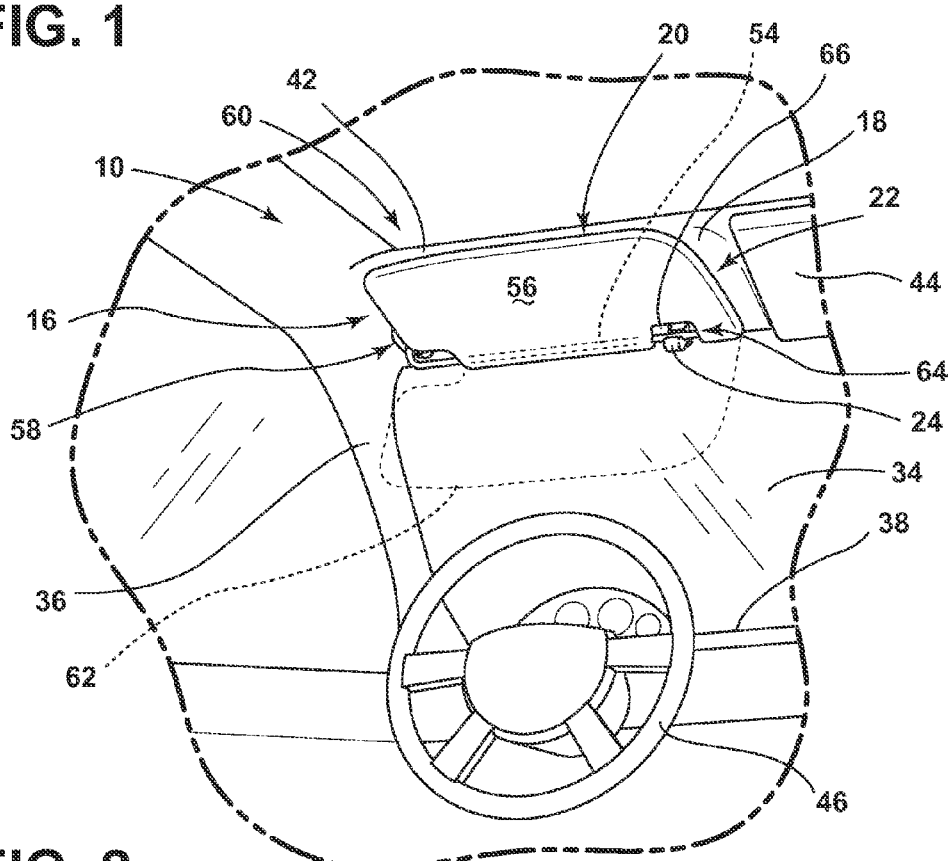
FIG. 2 is a bottom perspective view of a driver side portion of the passenger compartment of the vehicle, illustrating a visor assembly.

As shown in FIG. 2, the visor 14 (FIG. 1) of the visor assembly 10 includes a support member 54 extending through an edge portion of a shade panel 56. The first end 16 of the visor 14 includes a pivot end 58 of the support member 54 that is pivotally coupled with an outboard region of the header 18 proximate the A-pillar 36 on the corresponding side of the vehicle 12. The pivot end 58 typically includes a frictional pivot joint attached to the header 18, which allows the visor 14 to maintain a fixed position upon movement about the pivot end 58. However, it is contemplated that the frictional pivot joint may be otherwise replaced with an alternative connection or be otherwise omitted. The intermediate portion 20 of the visor 14 includes the support member 54 contained within the edge portion of the shade panel 56. In the illustrated embodiment, the shade panel 56 is rotatable about the support member 54 from a retained position 60 to a deployed position 62, allowing an occupant to adjust the angle of the shade panel 56 and the amount of the shade panel 56 desired to be blocking the forward view of an occupant seated in the driver's side seat 48 (FIG. 1). The shade panel 56 may be positioned at any intermediate position between the retained and deployed positions 60, 62, as well as other positions not illustrated. It is also contemplated that the shade panel 56 may be alternatively pivoted to the deployed position 62 about the pivot end 58 of the visor 14 in conjunction with the frictional pivot joint, opposed to rotating about the support member 54.

As also shown in FIG. 2, the second end 22 of the visor 14 includes a securing portion 64 of the support member 54 that is exposed from the edge portion of the shade panel 56 proximate a notch 66 in the shade panel 56. The securing portion 64 of the support member 54 includes a cylindrical shaped shaft extending laterally adjacent to the headliner 42 and configured to engage the retention check 24. The notch 66 in the shade panel 56 is configured to facilitate the engagement of the support member 54 and the retention check 24, in addition to allowing the shade panel 56 to rotate between the retained and deployed positions 60, 62. The retention check 24 is coupled with an inboard region of the header 18 proximate the central region of the headliner 42 and the accessory compartment 44. The retention check 24 is configured to retain the second end 22 of the visor 14 to the headliner 42, permitting the shade panel 56 to rotate between the retained and deployed positions 60, 62. It is contemplated that the securing portion 64 of the support member 54 may be alternatively shaped or arranged on the visor 14 to engage the outward protruding member 28 of the retention check 24. It is also envisioned that the first and second ends 16, 22 of the visor 14 may be reversed, such that the retention check 24 is coupled with the outboard region of the header 18 and the pivot end 58 of the support member 54 is coupled with the header 18 proximate the accessory compartment 44.

Figure 3:
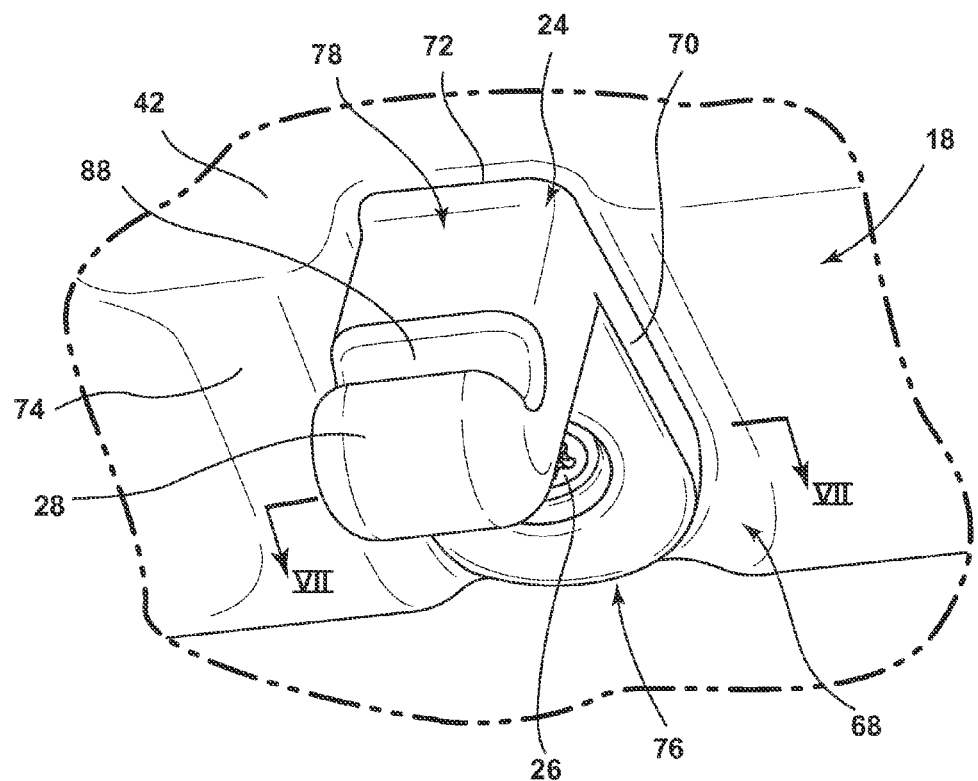
FIG. 3 is a bottom perspective view of a retention check of the vehicle visor assembly on a header of the vehicle.

Referring now to FIG. 3, the headliner 42 has a recessed area 68 for receiving a body portion 70 of the retention check 24. Accordingly, the recessed area 68 includes curved walls extending down and away from a mounting surface 72 of the recessed area 68. The curved walls extend to a peripheral surface 74 that surrounds the recessed area 68 of the headliner 42 and is generally in planar alignment with the headliner 42 that extends beneath the shade panel 56 (FIG. 2) of the visor assembly 10 and adjacent to the upper portion of the windshield 34. The recessed area 68 of the headliner 42 may be similarly included in a depressed portion the header 18 beneath the headliner 42, although it is contemplated that the header 18 may otherwise not include the depressed portion. In the illustrated embodiment, a forward end 76 of the retention check 24 is coupled with the recessed area 68 of the headliner 42 about the fastener 26 proximate the upper portion of the windshield 34. A rearward end 78 of the retention check 24 includes the member 28 protruding rearward and downward, toward an occupant seated in the driver's side seat, for engaging the securing portion 64 (FIG. 2) of the support member 54 (FIG. 2). It is also conceivable that the forward and rearward ends 76, 78 of the retention check 24 may be reversed in the recessed area 68 to position the outward extending member 28 in closer proximity to the windshield 34.

Figure 4:
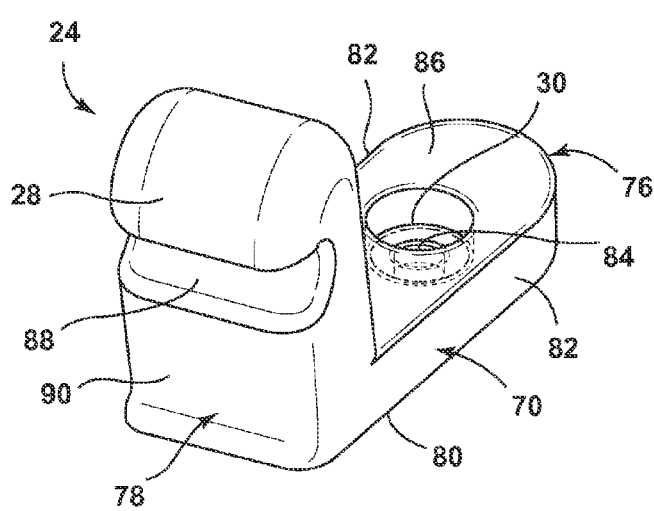
FIG. 4 is a top perspective view of the retention check.

One embodiment of the retention check 24, as illustrated in FIG. 4, has an upper surface 80 or interior side of the body portion 70 that abuts the mounting surface 72 within the recessed area 68 of the headliner 42, thereby generally engaging the header 18. The forward end 76 of the body portion 70 includes a circular curvature generally defining a half circle that connects the lateral edges 82 of the body portion 70 to provide a smooth and continuous edge bordering three sides of an aperture 84 extending through a central area of the body portion 70. The aperture 84 extends through the body portion 70, between the interior side 80 and an exterior side 86 or bottom surface of the body portion 70. The rearward end 78 of the retention check 24 includes the outward protruding member 28 that extends away from the body portion 70. The member 28 includes a width that generally spans between the lateral edges 82 of the body portion 70. A distal end of the member 28 has a rounded shape to reduce sharp corners that may cause damage or injury to an object directly impacting the member 28, such as the occupant's head or other body portions. A connector 88 is disposed on the member 28 for retaining the securing portion 64 (FIG. 2) of the visor 14. In the illustrated embodiment, the connector 88 has a cylindrically shaped channel formed in a forward facing surface 90 of the member 28, such that the cylindrical shaped shaft on the securing portion 64 of the support member 54 (FIG. 2) is frictionally retained by the channel. It is contemplated that alternative connectors 88 may be employed on the member 28 to otherwise retain and engage the visor 14.

Figure 5:
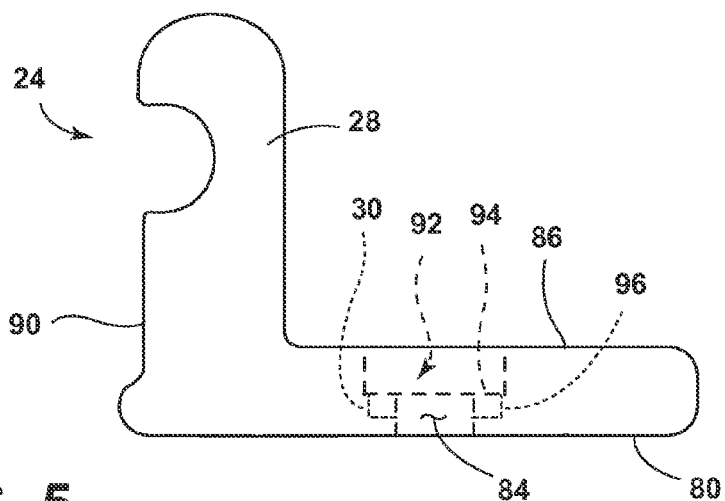
FIG. 5 is a side elevational view of the retention check.
Figure 6:
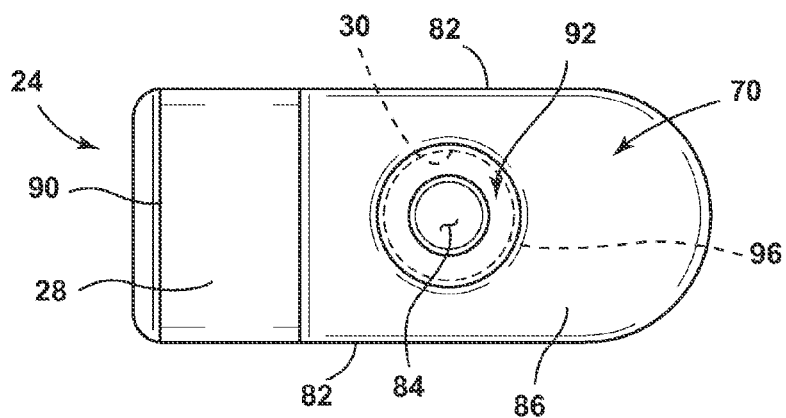
FIG. 6 is a top plan view of the retention check.

As shown in FIGS. 5-6, the aperture 84 in the central region of the body portion 70 extends between the exterior side 86 of the body portion 70 and the interior side 80 of the body portion 70. The aperture 84 is configured to receive a fastener 26 (FIG. 3) that couples the retention check 24 with the header 18. Accordingly, the interior side 80 of the body portion 70 is shaped to align with and fit within the recessed area 68 of the headliner 42 (FIG. 3), such that the fastener 26 extends to penetrate and engage the headliner 42. The weakened portion 30 is disposed between the aperture 84 and the member 28 and is adapted to fracture when the member 28 receives an impact force, as described in more detail below. The weakened portion 30 may conceivably include various embodiments from those illustrated.

In the embodiment illustrated in FIGS. 5-6, a cylindrical cavity 92 extends into the exterior side 86 of the body portion 70 in co-axial alignment with the aperture 84. The cavity 92 has a depth that is defined between exterior side 86 of the body portion 70 and a base surface 94 of the cavity 92. The depth of the cavity 92 is typically less than half the thickness of the body portion 70, which is defined between the exterior side 86 and the interior side 80 of the body portion 70. However, it is contemplated that the cavity 92 may have alternative depths to correlate with thickness of the body portion 70. As also shown in the illustrated embodiment, the weakened portion 30 includes a perforation 96 that surrounds the aperture 84 and is adapted to fracture when the member receives an impact force. The perforation 96 includes a series of depressions on the base surface 94 of the cavity 92. The depressions are shown to have a depth of substantially half the distance between the base surface 94 of the cavity 92 and the interior side 80 of the body portion 70. However, the perforation 96 may extend entirely through the body portion 70 or may otherwise have a depth less than or greater than the illustrated depth. The series of depressions are formed in the shape of a generally rectangular slot, but may otherwise be formed in the shape of a cylindrical hole or other conceivable geometric arrangements. It is also contemplated that the perforation 96 may be alternatively arranged on the body portion 70, such as disposed linearly across the width of the body portion 70 or other areas of the body portion 70 between the aperture 84 and the member 28. The weakened portion 30 is designed for the specific material type and various temperature environments exposed to the retention check 24. Accordingly, in additional embodiments, including those having alternative materials or tolerances, the weakened portion 30 may also include other weakened deformations or structural designs that include a lesser amount of structural material relative to the structural material surrounding the weakened portion 30.

Figure 7:
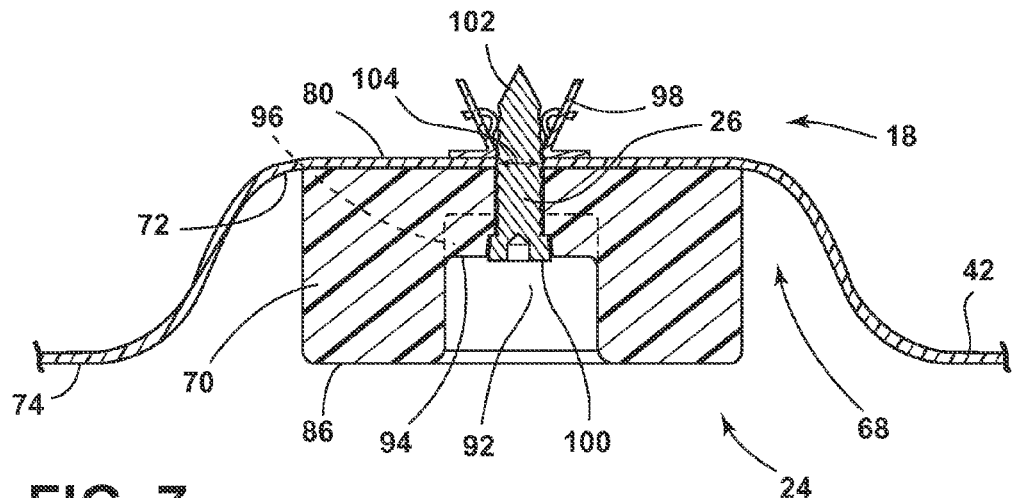
FIG. 7 is a cross-sectional view of the retention check taken at line VII-VII of FIG. 3.

As shown in FIG. 7, the retention check 24 is engaged with the mounting surface 72 within the recessed area 68 of the headliner 42, whereby a fastener 26 extends through the aperture 84 (FIG. 6) and engages a coupling 98 beneath the headliner 42. The exterior side 86 or bottom surface of the body portion 70 is positioned in generally planar alignment with the peripheral surface 74 that surrounds the recessed area 68. In the illustrated embodiment, the fastener 26 is a threaded screw with a head portion 100 and a shank portion 102. The head portion 100 is generally retained at the base surface 94 of the cylindrical cavity 92, such that the head portion 100 resides above the peripheral surface 74 of the headliner 42. The shank portion 102 of the fastener 26 extends upward through the aperture 84 and through an attachment opening 104 formed in the headliner 42 to threadably engage the coupling 98. The fastener 26 rigidly retains the retention check 24 to the header 18. The coupling 98 may conceivably be an integral portion of the header 18 or headliner 42 or alternatively may be a separate connection piece between the headliner 42 and the header 18. It is also contemplated that the fastener 26 may alternatively employ a snap fit tab, hidden clip, or other fastener generally understood by one having ordinary skill in the art.

Figure 8:
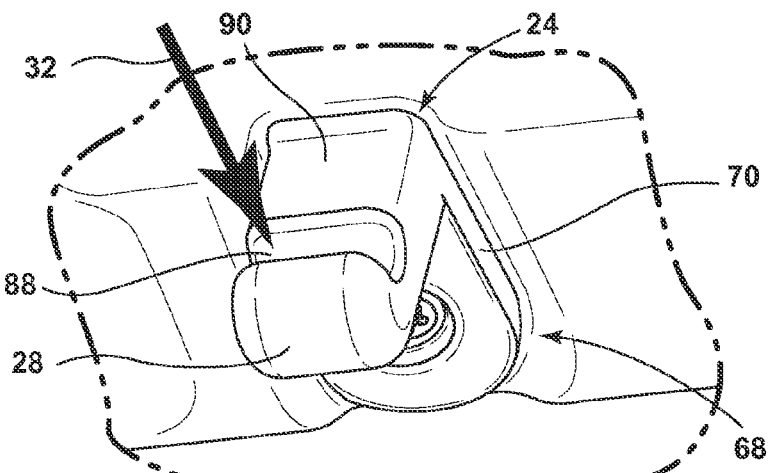
FIG. 8 is a bottom perspective view of the visor retention check and a vehicle header, showing an impact force.
Figure 8A:
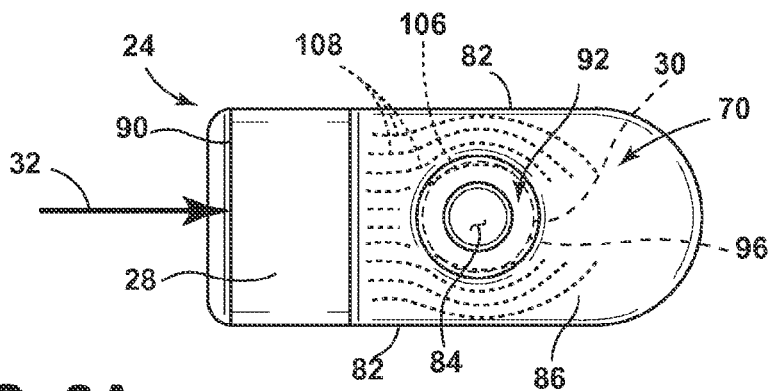
FIG. 8A is a top plan view of the retention check showing dashed stress lines resulting from the impact force.

Referring now to FIGS. 8-8A, an impact force 32 from an object is illustrated with an arrow on the member 28 protruding from the body portion 70 of the retention check 24. The impact force 32 is shown as a forward force received on the forward facing surface 90 of the member 28 proximate the connector 88. The arrow is reflective of such an impact force 32 that may also be delivered directly by an object or indirectly by the visor 14 (FIG. 1) transmitting the impact force 32 of an object to the member 28. The impact force 32 on the member 28 creates a stress riser 106 proximate the weakened portion 30, as shown in FIG. 8A. The stress riser 106 is a concentration of stresses 108 in the body portion resulting from the impact force 32 directed to the member 28. The weakened portion 30, namely the perforation 96 in the illustrated embodiment, is formed around the aperture 84 to be on or in close proximity to the stress riser 106 and at least in the general vicinity of the stress riser 106. It is also contemplated that the impact force 32 may be received from the illustrated direction or alternative generally forward directions to achieve a similarly positioned stress riser 106 proximate the weakened portion 30.

Figure 9:
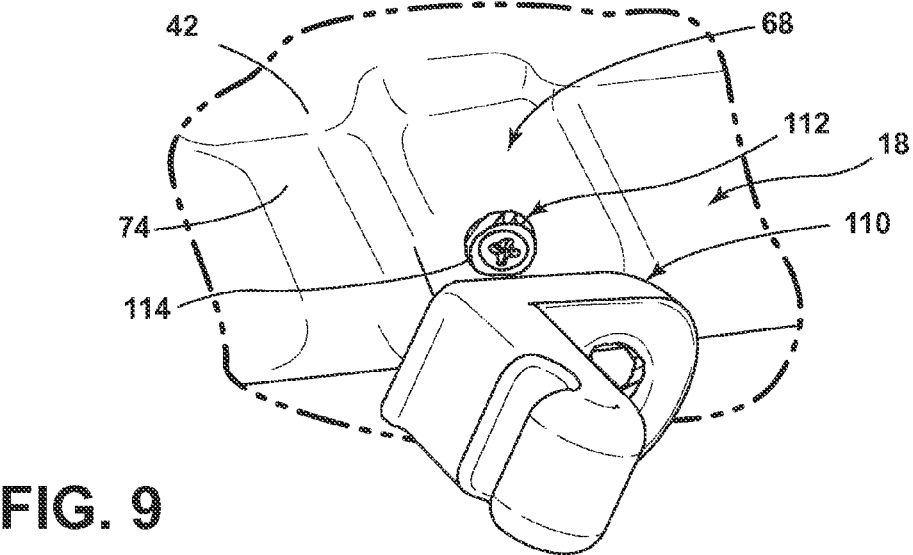
FIG. 9 is a bottom perspective view of the retention check and header, showing an attached piece and a detached piece of the retention check resulting from the impact force.

When the magnitude of the impact force 32 (FIG. 8A) exceeds a threshold level, the body portion 70 fractures along the weakened portion 30, as illustrated in FIG. 9. In the illustrated embodiment, the threshold level is generally defined as a force typically greater than 250 N, and in some embodiments is a force greater than 170 N. The threshold level is further defined in one embodiment during a collision of the vehicle 12 as an impact force resulting from an object weighing approximately 10 lbs and traveling between 12 and 15 mph before it collides with the member 28. However, it is contemplated that the threshold level may be configured for the fracture to occur at lower forces or higher forces and may also be dependent on environmental characteristics, such as the temperature and humidity within the vehicle 12. The fractured perforation 96 (FIG. 8A) forms a detached piece 110 that includes the member 28 and an attached piece 112 that includes the aperture 84 and the fastener 26. Accordingly, the detached piece 110 is displaced from the headliner 42, moving a significant portion of the interior side 80 (FIG. 7) of the body portion 70 out of contact with the headliner 42. The detached piece 110 includes the entire member 28 and also generally includes a substantial mass of the body portion 70. However, it is conceivable that the detached piece 110 may include a lesser amount of the body portion 70 if the weakened portion 30 is alternatively positioned. The attached piece 112 includes a halo shaped piece 114 of the body portion 70 defined by the material inside the perforation 96 (FIG. 6), generally including the base surface 94 of the cavity 92 and the material adjacently surrounding the fastener 26. The attached piece 112 is sized to reside entirely above the peripheral surface 74 that surrounds the recessed area 68 of the headliner 42. Accordingly, after the body portion 70 is fractured along the perforation 96, an object or the visor 14 (FIG. 1) delivering the impact force 32 (FIG. 8) to the member 28 is allowed to easily pass beyond the attached piece 112 of the retention check 24 with minimal resistance from the attached piece 112.

It will be understood by one having ordinary skill in the art that construction of the described invention and other components is not limited to any specific material. Other exemplary embodiments of the invention disclosed herein may be formed from a wide variety of materials, unless described otherwise herein.

For purposes of this disclosure, the term "coupled" (in all of its forms, couple, coupling, coupled, etc.) generally means the joining of two components (electrical or mechanical) directly or indirectly to one another. Such joining may be stationary in nature or movable in nature. Such joining may be achieved with the two components (electrical or mechanical) and any additional intermediate members being integrally formed as a single unitary body with one another or with the two components. Such joining may be permanent in nature or may be removable or releasable in nature unless otherwise stated.

It is also important to note that the construction and arrangement of the elements of the invention as shown in the exemplary embodiments is illustrative only. Although only a few embodiments of the present innovations have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter recited. For example, elements shown as integrally formed may be constructed of multiple parts or elements shown as multiple parts may be integrally formed, the operation of the interfaces may be reversed or otherwise varied, the length or width of the structures and/or members or connector or other elements of the system may be varied, the nature or number of adjustment positions provided between the elements may be varied. It should be noted that the elements and/or assemblies of the system may be constructed from any of a wide variety of materials that provide sufficient strength or durability, in any of a wide variety of colors, textures, and combinations. Accordingly, all such modifications are intended to be included within the scope of the present innovations. Other substitutions, modifications, changes, and omissions may be made in the design, operating conditions, and arrangement of the desired and other exemplary embodiments without departing from the spirit of the present innovations.

It will be understood that any described processes or steps within described processes may be combined with other disclosed processes or steps to form structures within the scope of the present invention. The exemplary structures and processes disclosed herein are for illustrative purposes and are not to be construed as limiting.

It is also to be understood that variations and modifications can be made on the aforementioned structure without departing from the concepts of the present invention, and further it is to be understood that such concepts are intended to be covered by the following claims unless these claims by their language expressly state otherwise.

I claim:

1. A vehicle visor assembly, comprising:
a visor including a first end pivotally coupled with a header, an intermediate portion, and a second end; and
a retention check coupled with the header about a fastener and including an aperture for receiving the fastener, an outward protruding member for retaining the second end of the visor and a perforation between the member and the fastener configured to fracture when the member receives an impact force.

2. The vehicle visor assembly of claim 1, wherein the impact force on the member creates a stress riser proximate the perforation.

3. The vehicle visor assembly of claim 1, wherein the perforation surrounds the aperture, and wherein the impact force on the member creates a stress riser proximate the perforation to fracture the retention check around the fastener.

4. The vehicle visor assembly of claim 1, wherein the header includes a headliner proximate a front window, and wherein the retention check includes a body portion having a top surface coupled with the headliner.

5. The vehicle visor assembly of claim 4, wherein the headliner has a recessed area for receiving the body portion, and wherein the member protrudes from the body portion out of the recessed area to engage the second end of the visor.

6. A visor retention check, comprising:
a body portion for engaging a vehicle header;
a member protruding from the body portion and having a connector for retaining a visor;
an aperture extending through the body portion for receiving a fastener that couples with the vehicle header; and
a weakened portion surrounding the aperture and adapted to fracture when the member receives an impact force.

7. The visor retention check of claim 6, wherein the weakened portion includes a perforation on a bottom surface of the body portion.

8. The visor retention check of claim 6, further comprising:
a cavity extending into the body portion, wherein the aperture is centrally disposed within the cavity.

9. The visor retention check of claim 8, wherein the weakened portion includes a perforation disposed on a base surface of the cavity.

10. The visor retention check of claim 9, wherein the cavity includes a depth define between the base surface and a bottom surface of the body portion, and wherein the depth is less than half a thickness of the body portion.

11. The visor retention check of claim 6, wherein the header includes a headliner having a recessed area for engaging the body portion and retaining an attached piece of the body portion after the impact force on the member fractures the weakened portion.

12. The vehicle visor assembly of claim 11, wherein the fractured perforation forms a detached piece that includes the member, and wherein the attached piece resides entirely above a peripheral surface surrounding the recessed area of the headliner.

13. A retention check for a vehicle visor, comprising:
a body portion having an interior side for engaging a header;
a member protruding from an exterior side of the body portion for engaging the vehicle visor;
an aperture extending between the exterior and interior sides for receiving a fastener that couples with the header; and
a perforation surrounding the aperture for creating a stress riser.

14. The retention check of claim 13, wherein the perforation includes a series of slots on the exterior side.

15. The retention check of claim 13, wherein an impact force on the member creates the stress riser proximate the perforation to fracture the body portion around the aperture.

16. The retention check of claim 13, further comprising:
a cylindrical cavity extending into the body portion coaxial with the aperture, wherein the perforation is disposed within the cavity.

17. The retention check of claim 16, wherein the perforation includes a series of slots along a periphery of a base surface of the cylindrical cavity.

18. The retention check of claim 13, wherein an impact force on the member having a magnitude greater than a threshold level causes the body portion to fracture along the perforation to define an attached piece that includes the aperture and a detached piece that includes the member.

19. The retention check of claim 18, wherein the attached portion is sized to resides entirely above a peripheral surface surrounding a recessed area on the header.

* * * * *